United States Patent
Morelius et al.

(10) Patent No.: US 9,850,918 B2
(45) Date of Patent: Dec. 26, 2017

(54) HYDRAULIC SYSTEM FOR A WORKING MACHINE AND A METHOD FOR CONTROLLING A HYDRAULIC SYSTEM

(71) Applicant: VOLVO CONSTRUCTION EQUIPMENT AB, Esklistuna (SE)

(72) Inventors: Robert Morelius, Eskilstuna (SE); Kim Heybroek, Kvicksund (SE)

(73) Assignee: Volvo Construction Equipment AB, Eskilstuna (SE)

( * ) Notice: Subject to any disclaimer, the term of this patent is extended or adjusted under 35 U.S.C. 154(b) by 75 days.

(21) Appl. No.: 14/892,510

(22) PCT Filed: Jun. 3, 2013

(86) PCT No.: PCT/SE2013/000092
§ 371 (c)(1),
(2) Date: Nov. 19, 2015

(87) PCT Pub. No.: WO2014/196904
PCT Pub. Date: Dec. 11, 2014

(65) Prior Publication Data
US 2016/0084277 A1    Mar. 24, 2016

(51) Int. Cl.
*F15B 11/10*    (2006.01)
*F16H 61/448*    (2010.01)
(Continued)

(52) U.S. Cl.
CPC ............... *F15B 11/10* (2013.01); *B60K 6/12* (2013.01); *E02F 3/422* (2013.01); *E02F 3/431* (2013.01);
(Continued)

(58) Field of Classification Search
CPC ... B60K 6/12; B60K 6/46; E02F 3/422; E02F 3/431; E02F 9/123; E02F 9/2217;
(Continued)

(56) References Cited

U.S. PATENT DOCUMENTS 5,207,060 A    5/1993    Sheets
5,971,027 A    10/1999   Beachley
(Continued)

FOREIGN PATENT DOCUMENTS

CN    201116558 Y    9/2008
CN    101873945 A    10/2010
(Continued)

OTHER PUBLICATIONS

Chinese Official Action (dated Mar. 2, 2017) for corresponding Chinese App. 201380077144.0.
(Continued)

*Primary Examiner* — Logan Kraft
(74) *Attorney, Agent, or Firm* — WRB-IP LLP

(57) ABSTRACT

A hydraulic system includes a first and a second rotating hydraulic machine, the first and second hydraulic machine being arranged to provide a torque via a common output shaft; a first valve arrangement for providing a differential hydraulic pressure level over the first hydraulic machine by using two sources of hydraulic fluid having different hydraulic pressure levels, a second valve arrangement for providing a differential hydraulic pressure level over the second hydraulic machine by using two sources of hydraulic fluid having different hydraulic pressure levels; and a control unit configured to control the first valve arrangement and the second valve arrangement such that different discrete levels of torque are provided via the output shaft of the hydraulic system. A hydraulic system for providing different discrete levels of torque using one hydraulic machine and a plurality of differential pressure levels, and a method for controlling a hydraulic system, are also provided.

24 Claims, 7 Drawing Sheets

(51) Int. Cl.
| | | |
|---|---|---|
| *E02F 9/12* | (2006.01) | |
| *E02F 9/22* | (2006.01) | |
| *B60K 6/12* | (2006.01) | |
| *F16H 61/4035* | (2010.01) | |
| *F16H 61/4096* | (2010.01) | |
| *F15B 11/00* | (2006.01) | |
| *E02F 3/42* | (2006.01) | |
| *E02F 3/43* | (2006.01) | |

(52) U.S. Cl.
CPC ............ *E02F 9/123* (2013.01); *E02F 9/2217* (2013.01); *E02F 9/2253* (2013.01); *E02F 9/2289* (2013.01); *F15B 11/003* (2013.01); *F15B 11/006* (2013.01); *F16H 61/4035* (2013.01); *F16H 61/4096* (2013.01); *F16H 61/448* (2013.01); *F15B 2211/2053* (2013.01); *F15B 2211/20523* (2013.01); *F15B 2211/20569* (2013.01); *F15B 2211/212* (2013.01); *F15B 2211/30565* (2013.01); *F15B 2211/30575* (2013.01); *F15B 2211/7058* (2013.01); *F15B 2211/7107* (2013.01); *F15B 2211/76* (2013.01); *F15B 2211/763* (2013.01); *Y02T 10/6208* (2013.01)

(58) Field of Classification Search
CPC ..... E02F 9/2253; E02F 9/2267; E02F 9/2289; F16H 61/4035; F16H 61/4096; F16H 61/448; F15B 11/003; F15B 11/006; F15B 11/10; F15B 2211/20523; F15B 2211/20569; F15B 2211/212; F15B 2211/30565; F15B 2211/30575; F15B 2211/7058; F15B 2211/7107; F15B 2211/76; F15B 2211/763; F15B 2211/2053; Y02T 10/6208
See application file for complete search history.

(56) References Cited

U.S. PATENT DOCUMENTS

| | | | |
|---|---|---|---|
| 8,342,995 B2 * | 1/2013 | Grant .................... | B60K 6/12 180/165 |
| 9,512,859 B2 * | 12/2016 | Recoura ................. | F04B 1/047 |
| 2004/0011192 A1 * | 1/2004 | Frediani ................ | F15B 11/006 91/459 |
| 2008/0081724 A1 | 4/2008 | Ivantysynova et al. | |
| 2009/0008174 A1 | 1/2009 | Tikkanen et al. | |
| 2011/0003660 A1 | 1/2011 | Grant | |
| 2011/0056195 A1 | 3/2011 | Lloyd | |

FOREIGN PATENT DOCUMENTS

| | | |
|---|---|---|
| CN | 102449323 A | 5/2012 |
| FR | 2880143 A1 | 6/2006 |
| JP | 2004125094 A | 4/2004 |
| WO | 2007071362 A1 | 6/2007 |

OTHER PUBLICATIONS

International Search Report (dated Feb. 24, 2014) for corresponding International App. PCT/SE2013/000092.
International Preliminary Report on Patentabitity (dated May 22, 2015)) for corresponding international App. PCT/SE2013/000092.
European Official Action (dated May 12, 2017) for corresponding European App. EP 13 88 6367.

* cited by examiner

HYDRAULIC SYSTEM FOR A WORKING MACHINE AND A METHOD FOR CONTROLLING A HYDRAULIC SYSTEM

BACKGROUND AND SUMMARY

The invention relates to a hydraulic system for a working machine aid to a working machine comprising such a hydraulic system.

The invention is applicable on working machines within the fields of industrial construction machines, in particular wheel loaders, articulated haulers and excavators. Although the invention will be described hereinafter with respect to a wheel loader, the invention is not restricted to this particular machine, but may also be used in other heavy working machines, such as dump trucks, or other construction equipment.

Hydraulic systems are used in a wide range of applications. For example, working machines rely on hydraulic systems to provide power for handling a load. A hydraulic system for a working machine may comprise both linear actuators, i.e., hydraulic cylinders and rotary hydraulic machines, such as for example a hydraulic motor.

As the demands for energy efficiency in working machines are increasing, it is becoming more and more important to ensure that all parts of the working machine is as energy efficient as possible. Even though the energy efficiency of individual components in a general hydraulic system has been improved, the overall system efficiency tends to be low, and it may even be below 10%. Energy losses in the hydraulic system thus lead to increased fuel consumption, increased emissions and also to the need for additional cooling systems.

A hydraulic system may be used to power both linear actuators such as a hydraulic cylinder and rotating actuators such as a hydraulic motor.

Hydraulic motors may for example be used to provide the swing function of an excavator, as a fan motor of a wheel loader, hub-unit of a wheel drive, or for the track-drive of a crawler excavator.

A rotating hydraulic motor produces it mechanical torque T given a certain machine displacement D and a difference pressure $\Delta P$. Accordingly, the output torque of the hydraulic motor can be controlled by controlling either the displacement D or the pressure $\Delta P$. Furthermore, there is often a limitation of the maximum how within the supply system, which in turn gives rise to a maximum achievable rpm of the hydraulic motor.

In applications where a fixed displacement hydraulic motor is used, the torque is controlled by controlling the pressure, either by using a proportional valve or through some other pressure regulating means, such as a pressure regulating pump.

For a variable displacement hydraulic motor, it is also possible to control the output torque by varying the displacement. This enables the use of a hydraulic supply system providing constant pressure, which may be advantageous for example if it desirable to include a hydraulic energy storage in the hydraulic supply system.

In many applications, it is desirable that the hydraulic system is able to provide a continuously variable power output, in order to ensure smooth operation for varying loads. A continuously variable output may for example be achieved by using a variable displacement hydraulic machine as outlined above. However, as a variable displacement hydraulic machine is more complicated and thus more expensive than a fixed displacement hydraulic machine, for certain applications it may be more advantageous to use a fixed displacement hydraulic machine and where the variation of the power output is controlled by either by controlling the pressure or the fluid flow to the hydraulic machine.

To achieve a more energy efficient and flexible hydraulic system, the output torque of a constant pressure system can be controlled by connecting a proportional servo valve to a fixed displacement hydraulic machine.

However a constant pressure system using a proportional servo valve is only fully energy efficient if used at full load, i.e. when the valve is fully open. For partial loads, losses may occur in the servo valve, the lower the load, the higher the losses.

Accordingly, it is desirable to provide a more energy efficient hydraulic system.

In view of the above-mentioned desired properties of a hydraulic system for a working machine, and the above-mentioned and other drawbacks of the prior art, it is desirable to provide an improved hydraulic system for a working machine.

According to a first aspect of the present invention, it is therefore provided a hydraulic system comprising: a first rotating hydraulic machine and a second rotating hydraulic machine, said first and second hydraulic machine being arranged to provide a torque via a common output shaft; a first valve means for providing a differential hydraulic pressure level over the first hydraulic, machine by using two sources of hydraulic fluid having different hydraulic pressure levels, a second valve means for providing a differential hydraulic pressure level over the second hydraulic machine by using two sources of hydraulic fluid having different hydraulic pressure levels, a control unit configured to control said first valve means and said second valve means such that different discrete levels of torque are provided via the output shaft of the hydraulic system.

The present invention is based on the realization that different discrete levels of torque can be provided by applying a differential pressure over two separate hydraulic machines which are connected to the same output shaft.

According to one embodiment of the invention, at least one of the first and second hydraulic machines may be a fixed displacement hydraulic machine. Hydraulic machines having a fixed displacement are in general less complex compared to variable displacement hydraulic machines and can therefore be made at a lower cost. In a fixed displacement hydraulic machine, the output torque is controlled by controlling the differential pressure over the hydraulic machine.

In one embodiment of the invention, the first hydraulic, machine may have a first fixed displacement and the second hydraulic machine may have a second fixed displacement, the second fixed displacement being the same as the first fixed displacement.

Furthermore, in one embodiment of the invention, the second fixed displacement may be different from the first fixed displacement. By using only fixed displacement hydraulic machines, an energy efficient power system can be achieved. Furthermore, by using hydraulic machines having different fixed displacement connected to a common output shaft, the number of discrete torque levels that can be provided is increased.

According to one embodiment of the invention, the first hydraulic machine may be a fixed displacement hydraulic machine and the second hydraulic machine may be a variable displacement hydraulic machine.

It may be advantageous to use a variable displacement hydraulic machine in combination with one or more fixed displacement hydraulic machines in order to be able to provide a continuously variable output torque.

In one embodiment of the invention, the differential hydraulic pressure level may be provided by using a first hydraulic accumulator having a first hydraulic pressure level and a second hydraulic accumulator having a second hydraulic pressure level, the first hydraulic pressure level being different from the second hydraulic pressure level. By using hydraulic accumulators having fixed pressure levels for providing hydraulic fluid to the hydraulic machines via valve means, energy may be recuperated from the output shaft, via the hydraulic machines and stored in the accumulator, thereby increasing the energy efficiency of the hydraulic system. In embodiments where two or hydraulic accumulators are used in combination with a variable displacement hydraulic machine, it may be sufficient that only the hydraulic accumulator having the highest pressure is connected to the variable displacement hydraulic machine, and the low pressure side of the variable displacement hydraulic machine may then be connected to the accumulator having the lowest pressure, or to a tank representing the low pressure source. However, it may be advantageous to connect all hydraulic accumulators also to the variable displacement hydraulic machine in order to provide increased flexibility during operation of the hydraulic system. A further advantage of using one or more hydraulic accumulators in the power system is that it is possible to downsize the supply unit providing energy to the system, as such a supply unit can be dimensioned to handle the average energy requirement while one or more hydraulic accumulators can provide energy to accommodate peak loads.

In one embodiment of the invention, a pressure level of the first hydraulic accumulator may be fixed within a first predetermined range, and a pressure level of the second hydraulic accumulator may be fixed within a second predetermined range, the second predetermined range being different from the first predetermined range. The predetermined range may be small, such that the pressure level can be regarded as substantially constant, or the energy range may be relatively large such that different pressures can be provided by the hydraulic accumulators depending on different modes of operation of the hydraulic system. Furthermore by allowing the pressure of the accumulator to be varied, a particular hydraulic system may be used in applications having different requirements with regards to torque output.

Furthermore, the hydraulic system may advantageously comprise an accumulator charging system such as a hydraulic pump connected to an engine of a vehicle in which the hydraulic system is arranged. Through the hydraulic charging system, the pressure levels in the hydraulic accumulators may be maintained within predetermined pressure ranges. An additional advantage of using hydraulic accumulators for providing energy to the hydraulic system is that, for certain applications where allowable by the work cycle of the power system, the power supply, such as a combustion engine, may be reduced in size compared to if the power supply is directly connected to the hydraulic machines.

According to one embodiment of the invention, the first valve means may advantageously comprise a first valve connected between a first source of hydraulic fluid and a first side of the first hydraulic machine and a second valve connected between a second source of hydraulic fluid and a second side of the first hydraulic machine, and the second valve means may comprises a first valve connected between a first source of hydraulic fluid and a first side of the second hydraulic machine and a second valve connected between a second source of hydraulic fluid and a second side of the second hydraulic machine. The valves are arranged to control the flow between a source of fluid and a respective side of the hydraulic machine, so that a differential pressure may be provided over the hydraulic machine by controlling, the respective valves. In principle, the valve means may comprise a valve block, or a valve matrix, having a plurality of inlets and a plurality and a plurality of outlets, and being configured to provide the desire functionality.

According to one embodiment of the invention, the valve means may advantageously comprise on/off valves. Although conventional flow regulating valves may be used to provide the desired function, it is preferable to use on/off valves as they can have a more simple construction, and thereby be made at a lower cost than a proportional servo valve. It is also desirable to be able to switch the valve fast, which can be achieved by an on/off valve.

Furthermore, an on/off valve is more energy efficient in comparison to a proportional servo valve used proportionally. Thereby, the energy efficiency of the system may be further improved through the combination of hydraulic accumulators each having an essentially constant pressure level being connected to fixed displacement hydraulic machines via on/off valves. An on/off valve can for example be provided in the form of a poppet valve or a spool valve. An on/off valve is sometimes also referred to as a digital valve. In principle, it is preferable to use a valve having a relatively small or negligible pressure drop over the valve. The person skilled in the art readily realizes that various valve arrangements and types of valves are possible while still providing the desired function of controlling the differential pressures over the respective hydraulic machines.

In one embodiment of the invention, the first hydraulic machine may have a first fixed displacement D1 and the second hydraulic machine may have a second fixed displacement $D_2=D1*(2*n+1)$, where n is the number of different hydraulic, pressure levels available in said hydraulic system. It is advantageous to select the displacement of the fixed displacement hydraulic machine in relation to the number of available pressure levels in the system such that as many discrete torque levels as possible can be provided via the output shaft, and such that the difference in torque, i.e. the torque step, is the same for any two adjacent torque levels.

Furthermore, in a hydraulic system comprising k fixed displacement hydraulic machines, k≥2, each hydraulic machine having a fixed displacement different from a fixed displacement of any of the remaining hydraulic machines, and n different hydraulic pressure levels, n>2, the displacement for hydraulic machine k may advantageously be selected as $D_k=D1*(2*n+1)^{k-1}$, where $D^<i$ is the fixed displacement of the hydraulic machine having the lowest fixed displacement.

According to one embodiment of the invention, the hydraulic system may advantageously comprise at least three different pressure levels, wherein a difference in pressure between the two lowest pressure levels, pi and p2, is $\Delta p1=p2-p1$, and wherein a pressure of the $n^{th}$ pressure level is selected as $p_n=p1+\eta*\Delta p1$. By selecting the n pressure levels (n>2) according to the aforementioned description, the resulting number of discrete torque steps nj for each hydraulic machine, of equal step size, is $nt=1+(n-2)*2$. Accordingly, the total number of torque steps is $n_T$ times the number of fixed displacement hydraulic machines having different displacement. The different pressure levels may for example be provided by hydraulic accumulators, or they may be provided by other means for providing a hydraulic pressure such as a hydraulic pump arrangement.

According to a second aspect of the invention, there is provided a hydraulic system comprising: a rotating hydraulic machine arranged to provide a torque via an output shaft; a first valve means for providing a first differential hydraulic pressure level over the hydraulic machine by using two sources of hydraulic fluid having different hydraulic pressure levels, a second valve means for providing a second differential hydraulic pressure level over the hydraulic machine by using two sources of hydraulic fluid having different hydraulic pressure levels, an absolute value of the second differential hydraulic pressure level being different from an absolute value of the first differential hydraulic pressure level; and a control unit configured to control the first valve means and the second valve means such that different discrete levels of torque are provided via the output shaft of the hydraulic system.

It is further realized by the inventors that it is possible to provide different discrete levels of torque by applying a different differential pressures over a hydraulic machine using discrete pressure levels to achieve the different differential pressures.

In one embodiment of the invention, the rotating hydraulic machine may advantageously have a fixed displacement. Thereby, the output torque is controlled through the different discrete differential pressures which may be applied over the fixed displacement hydraulic machine.

In one embodiment of the invention, the hydraulic system may advantageously comprise a first source of hydraulic fluid having a first hydraulic pressure level, a second source of hydraulic fluid having a second hydraulic pressure level different from the first pressure level, and a third source of hydraulic fluid having a third hydraulic pressure level different from the first and the second pressure level; wherein the first valve means and the second valve means use one source of hydraulic fluid in common. Through the use of three different sources of hydraulic fluid having different pressure levels, a plurality of different differential pressures can be applied over the fixed displacement hydraulic machine in order to provide different discrete levels of output torque on the output shaft.

Furthermore a difference in pressure between the second pressure level and the third pressure level is advantageously substantially twice the difference between the first pressure level and the second pressure level. By selecting the difference between the highest and the middle of the pressure levels to be twice the size of the difference between the lowest pressure level and the middle pressure level, an optimal number of equidistant levels of output torque can be provided.

Further effects and features of this second aspect of the present invention are largely analogous to those described above in connection with the first aspect of the invention.

There is also provided a working machine comprising a hydraulic system according to any one of the aforementioned embodiments.

According to a third aspect of the present invention, there is provided a method for controlling a hydraulic system to provide discrete levels of output torque, the system comprising: a plurality of hydraulic machines arranged to provide a torque via a common output shaft, and valve means for providing a plurality of differential hydraulic pressures to each of the hydraulic machines, via the valve means from a plurality of sources of hydraulic fluid; the method comprising: controlling the valve means in response to a requested output torque level such that discrete output torque levels are provided by the output shaft by: if the requested output torque level is equal to or lower than a minimum torque level of the hydraulic system, providing the minimum output torque level by applying the lowest differential hydraulic, pressure to a hydraulic machine having the lowest fixed displacement; if the requested output torque level is equal to or higher than a maximum torque level of the hydraulic system providing a maximum output torque level by applying the highest differential hydraulic pressure to all of the plurality of hydraulic machines; and if the requested output torque level is between the minimum output torque level and the maximum output torque level, applying a differential hydraulic, pressure to at least one of the hydraulic machines such that a torque level closest to the requested torque level is provided.

According to a fourth aspect of the present invention, there is provided a method for controlling a hydraulic system to provide discrete levels of output torque, the system comprising: a hydraulic machine arranged to provide a torque via an output shaft, and valve means for providing at least three differential hydraulic pressures to each of the hydraulic machines, via the valve means, from a plurality of sources of hydraulic fluid; the method comprising: controlling the valve means in response to a requested output torque level such that discrete output torque levels are provided by the output shaft by if the requested output torque level is equal to or lower than a minimum torque level of the hydraulic system, providing the minimum output torque level by applying the lowest differential hydraulic pressure to the hydraulic machine; if the requested output torque level is equal to or higher than a maximum torque level of the hydraulic system, providing a maximum output torque level by applying the highest differential hydraulic pressure to the hydraulic machine; and if the requested output torque level is between the minimum output torque level and the maximum output torque level, applying a differential hydraulic pressure to the hydraulic machine such that a torque level closest to the requested torque level is provided.

According to a fifth aspect of the present invention, there is provided a method for controlling a hydraulic system to provide discrete levels of output torque, the system comprising: a first hydraulic machine having a fixed displacement, arranged to provide a torque via a common output shaft; a second hydraulic machine having a variable displacement, arranged to provide a torque via the common output shaft, a first valve means for providing a differential hydraulic pressure level over the first hydraulic machine by using two sources of hydraulic fluid having different hydraulic pressure levels; a second valve means for providing a differential hydraulic pressure level over the second hydraulic machine by using two sources of hydraulic fluid having different hydraulic pressure levels; the method comprising the steps of: controlling the valve means and the second hydraulic machine in response to a requested output torque level such that discrete output torque levels are provided by the output shaft by: applying a differential hydraulic pressure to the first hydraulic machine such that a torque level closest to the requested torque level is provided; and controlling the displacement and direction of the second hydraulic machine to add torque to or receive torque from the output shaft such that the requested output torque is provided.

Effects and features of the third, fourth and fifth aspects of the present invention are largely analogous to those described above in connection with the first and second aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION

In the present detailed description, various embodiments of a hydraulic system according to the present invention are mainly discussed with reference to a hydraulic system for a wheel loader. It should however be noted that this by no means limits the scope of the present invention which is equally applicable to hydraulic systems in other types of working machine.

Figure 1:
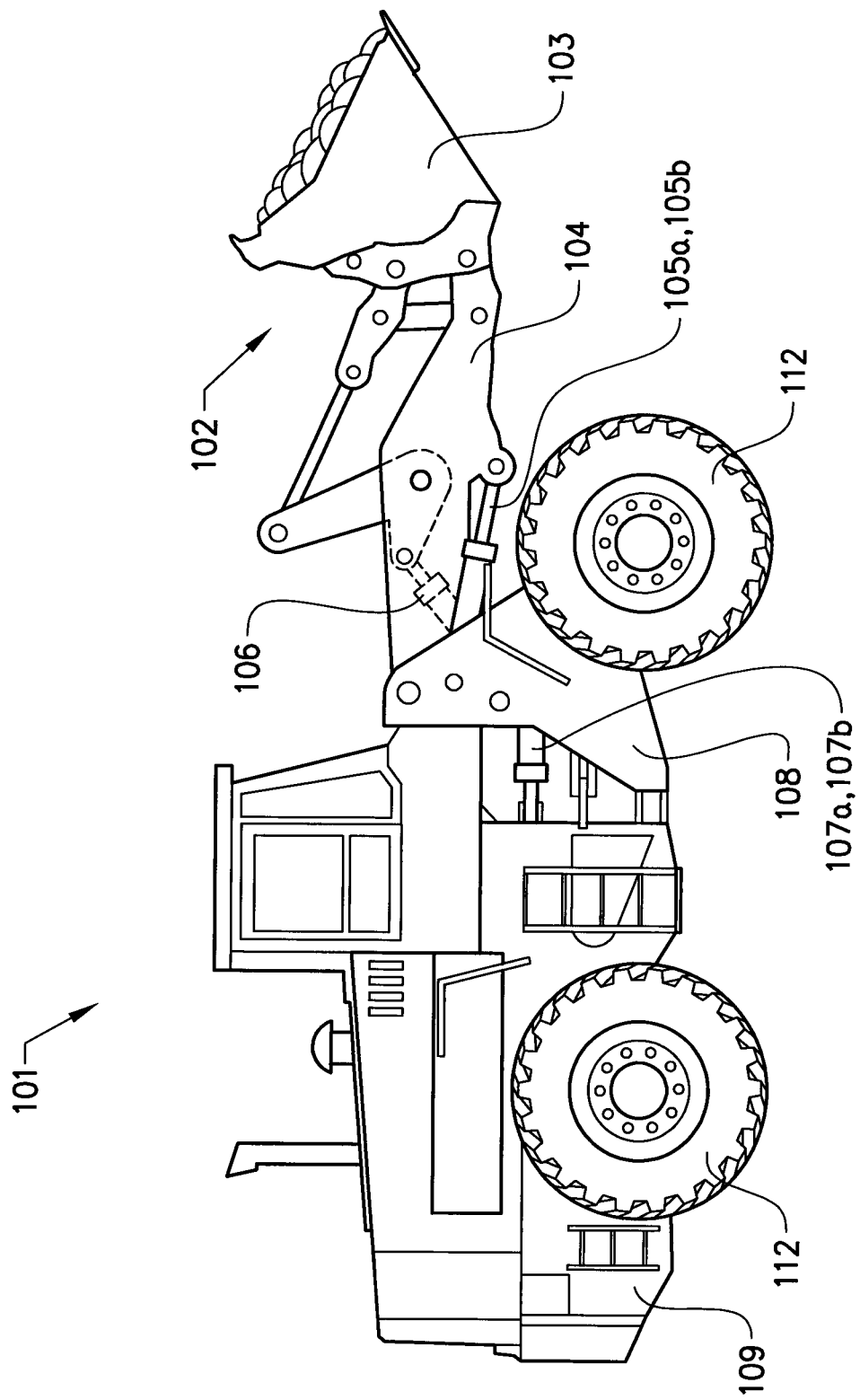
FIG. 1 is a lateral view illustrating an example embodiment of a working machine in the form of a wheel loader having a bucket for loading operations, and a hydraulic system for operating the bucket and steering the wheel loader.

Reference is now made to FIG. 1, illustrating a working machine 101, here in the form of a wheel loader having an implement 102. The term "implement" is intended to comprise any kind of tool using hydraulics, such as a bucket, a fork or a gripping tool arranged on a wheel loader, or a container arranged on an articulated hauler. The implement illustrated comprises a bucket 103 which is arranged on an arm unit 104 for lifting and lowering the bucket 103, and further the bucket 103 can be tilted or pivoted relative to the arm unit 104. The wheel loader 101 is provided with a hydraulic system for example to lift and tilt the bucket. In the example embodiment illustrated in FIG. 1 the hydraulic system comprises two hydraulic cylinders 105a, 105b for the operation of the arm unit 104 and a hydraulic cylinder 106 for tilting the bucket 103 relative to the arm unit 104. Furthermore the hydraulic system comprises two hydraulic cylinders 107a, 107b arranged on opposite sides of the wheel loader for turning the wheel loader by means of relative movement of a front body part 108 and a rear body part 109. In other words; the working machine is frame-steered b means of the steering cylinders 107a, 107b.

The working machine 101 is also provided with a prime mover, such as an internal combustion engine, and a driveline with a gearbox for supplying power to the driving wheels 112 of the working machine 101.

Figure 2:
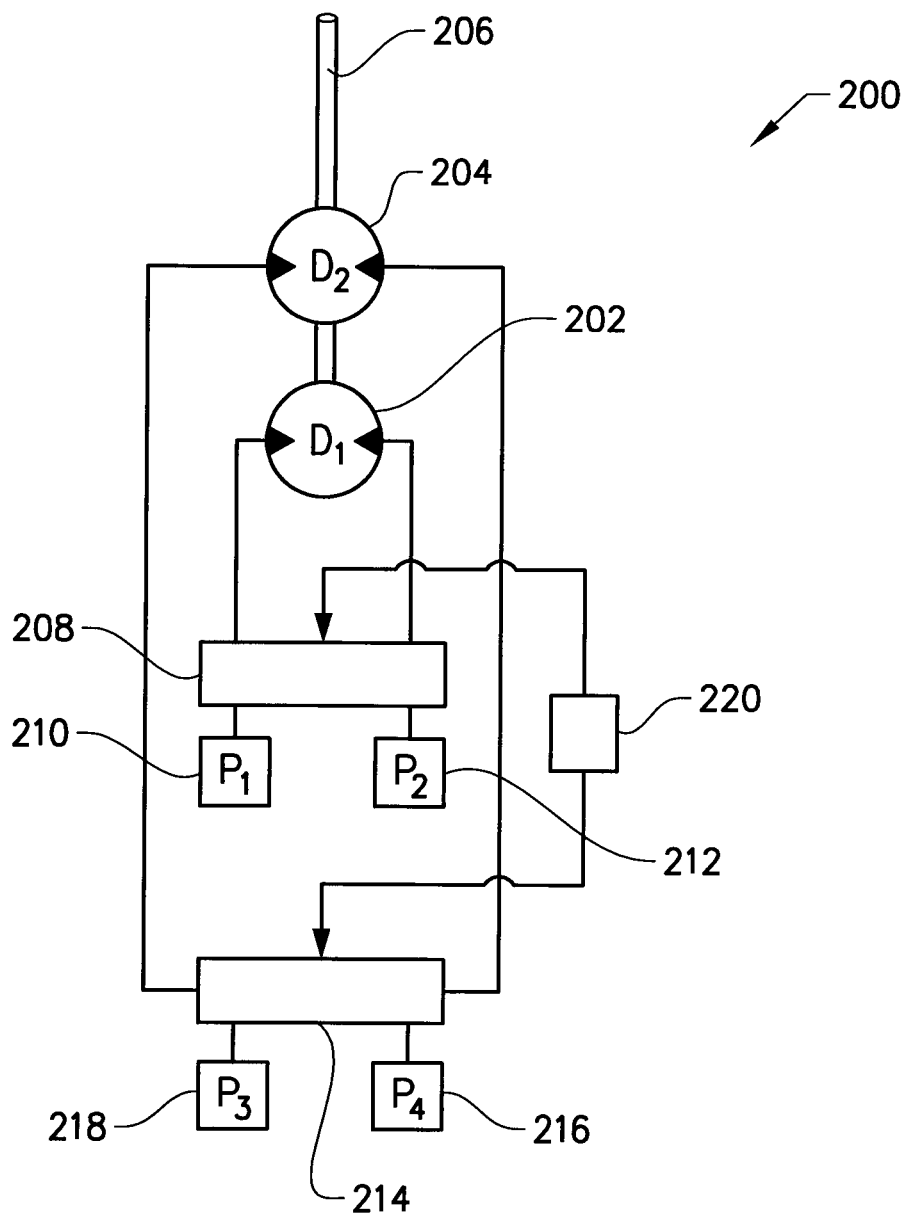
FIG. 2 schematically illustrates a hydraulic system according to an example embodiment of the invention.

FIG. 2 schematically illustrates a hydraulic system 200 according to one embodiment of the invention. The hydraulic system 200 comprises a first rotating hydraulic machine 202 having a displacement Di and a second rotating hydraulic machine 204 having a displacement $D_2$, both being arranged to provide a torque via a common output shaft 206.

The hydraulic system 200 further comprises a first valve means 208 for providing a differential hydraulic pressure level over the first hydraulic machine 202 by using two sources of hydraulic fluid 210, 212 having different hydraulic pressure levels Pi and $P_2$, a second valve means 214 for providing a differential hydraulic pressure level over the second hydraulic machine 204 by using two sources of hydraulic fluid 216, 218 having different hydraulic pressure levels $P_3$ and $P_4$, and a control unit 220 configured to control the first valve means 208 and the second valve means 214 such that different discrete levels of torque are provided via the output shaft 206 of the hydraulic system 200. The torque T provided to the output shaft from each hydraulic machine correspond to the differential hydraulic pressure times the displacement of the respective motor as T1=P1*D1 and $T_2$=ΔP2*D2, where ΔP1=P1−P2 and ΔP2=P3−P4. For example, the maximum output torque $T_{max}$ then becomes $T_{max}$=ΔP1*D1+ΔP2*D2. If both sides of each hydraulic machine may be connected to the higher pressure, the differential pressure may be ΔP=P1−P2 or ΔP=P2−P1 i.e. ΔP=±|P1−P2|.

Accordingly, different discrete levels of torque can be provided in both rotary directions of the output shaft by controlling the first and second valve means to provide the differential pressure to one or both of the hydraulic machines, and by controlling to which side of the respective hydraulic machine the high pressure and the low pressure is connected. In the above example, provided that either ΔP≠ΔP$_2$ or D1≠D$_2$ and assuming that T2>T1, four different discrete levels of torque can be provided in each rotary direction, namely T1, T2, T2−T1 and T1+T2. Moreover, two different differential pressure levels may be provided by three sources of hydraulic fluid having different pressure levels. Thus, above function of the hydraulic system in FIG. 2 would for example be achieved if P2=P3, and the two sources of hydraulic fluid 212 and 218 may be replaced by one source of hydraulic fluid.

Figure 3:
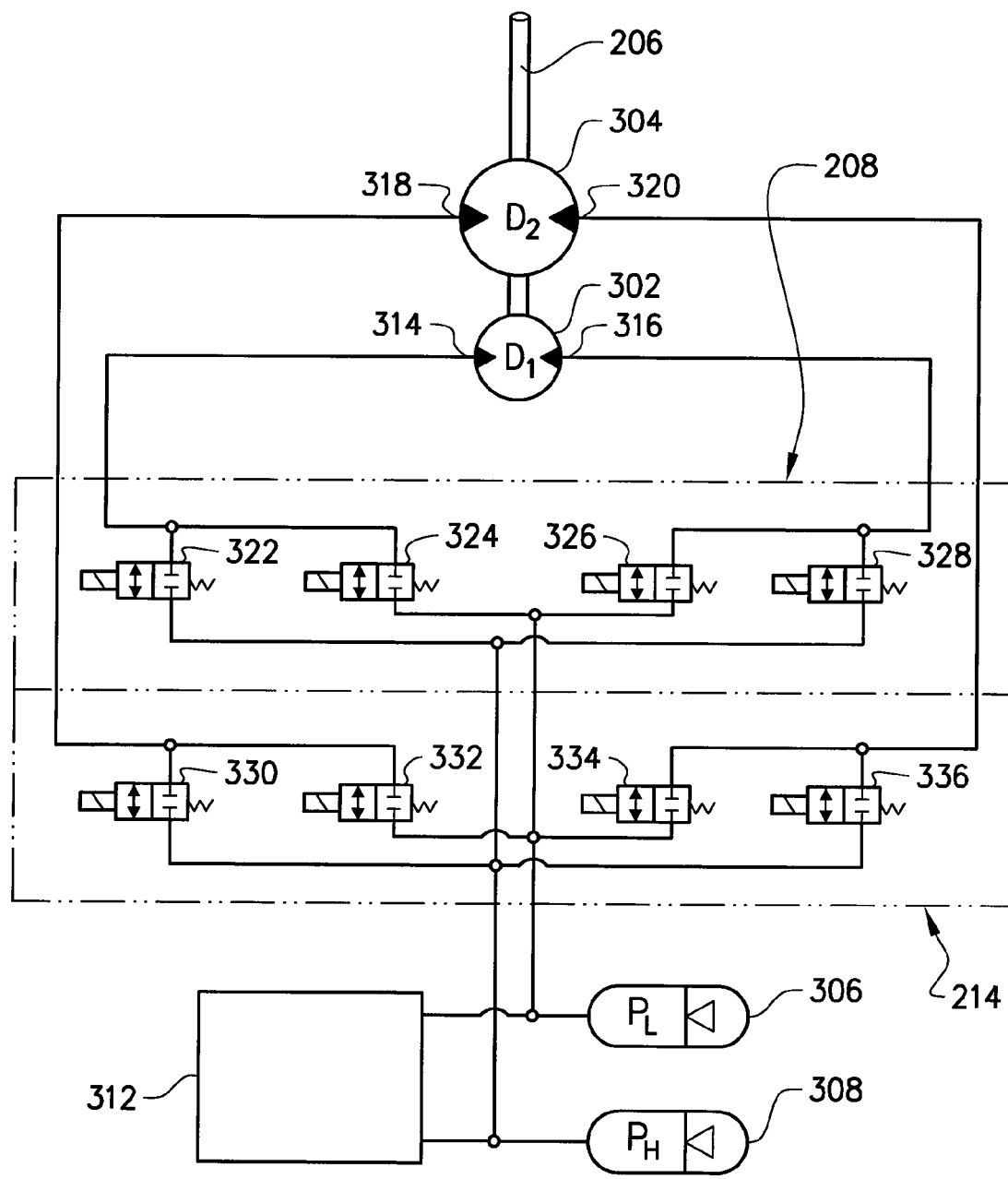
FIG. 3 schematically illustrates a hydraulic system according to an example embodiment of the invention.

FIG. 3 schematically illustrates a more detailed example embodiment of the general concept illustrated in FIG. 2. In FIG. 3, the first hydraulic machine 302 has a fixed displacement D1 which is smaller than a fixed displacement $D_2$ of the second hydraulic machine 304. Fixed displacement hydraulic machines are advantageously used as they can be made more energy efficient compared to variable displacement hydraulic machines. Thereby, the amount torque provided by each hydraulic machine is determined by the differential pressure applied over each hydraulic machine. Furthermore, the first valve means 208 and the second valve means 214 typically comprise a plurality of discrete valves. As it is desirable to provide a simple and relatively inexpensive system, logical on/off valves may advantageously be used since such valves can provide a low complexity and thereby be made at a low cost.

The hydraulic system of FIG. 3 also comprises hydraulic accumulators 306, 308 as means for providing hydraulic fluid having different pressure levels, PL and PH. By coupling the hydraulic accumulators to selected sides of each hydraulic machine, different constant differential pressure levels can be provided over each of the hydraulic machines.

Furthermore, the hydraulic system may advantageously comprise an accumulator charging system 312 such as a hydraulic pump connected to an engine of a vehicle in which the hydraulic system is arranged. Through the hydraulic charging system, the pressure levels in the hydraulic accumulators 306, 308 may be maintained within predetermined pressure ranges.

In particular, the valves in FIG. 3 are arranged so that:
PL is connected to the first side 314 of the first hydraulic machine 302 via valve 324;
PL is connected to the second side 316 of the first hydraulic machine 302 via valve 326;
PL is connected to the first side 318 of the second hydraulic machine 304 via valve 332;
PL is connected to the second side 320 of the second hydraulic machine 304 via valve 334;
PH is connected to the first side 314 of the first hydraulic machine 302 via valve 322;
PH is connected to the second side 316 of the first hydraulic machine 302 via valve 328;
PH is connected to the first side 318 of the second hydraulic machine 304 via valve 330; and
PH is connected to the second side 320 of the second hydraulic machine 304 via valve 336.

In the present description the valves are represented by on/off valves, also referred to as digital valves based on their functionality as a logical switch controlling a flow of hydraulic fluid by being either fully open or hilly closed. However, the same functionality may of course be provided by proportional servo valves, or other types of hydraulic valves, if used as on/off valves.

Figure 4A:
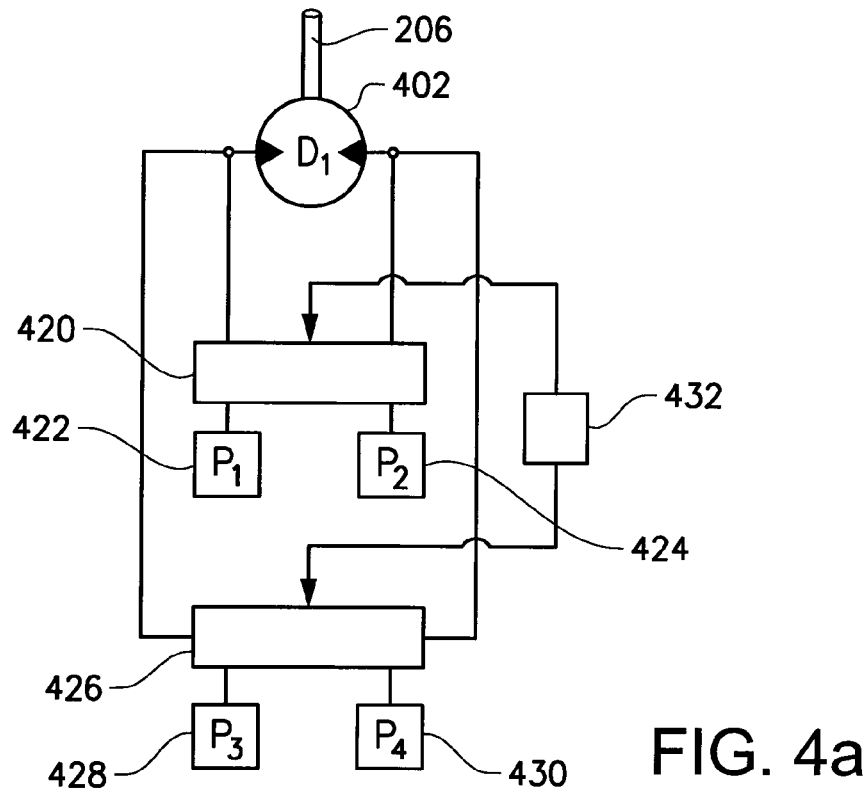
FIGS. 4a-b schematically illustrates a hydraulic system according to an example embodiment of the invention.

FIG. 4a schematically illustrates a hydraulic system comprising a fixed displacement hydraulic machine 402 where at least two different discrete levels of output torque via a first valve means 420 and a second valve means 426. Each of the valve means are connected to two sources of hydraulic fluid having different pressure levels, the first valve means 420 being connected to sources 422 and 424 having pressure levels P1 and P2, and the second valve means 426 being connected to sources 428 and 430 having pressure levels P3 and P4. The pressure levels P1 to P4 are selected such that an absolute value of a differential hydraulic pressure level provided by the first valve means 420 is different from an absolute value of a differential hydraulic pressure level provided by the second valve means 426. The valve means 420 and 426 are further controlled by a control unit 432.

Figure 4B:
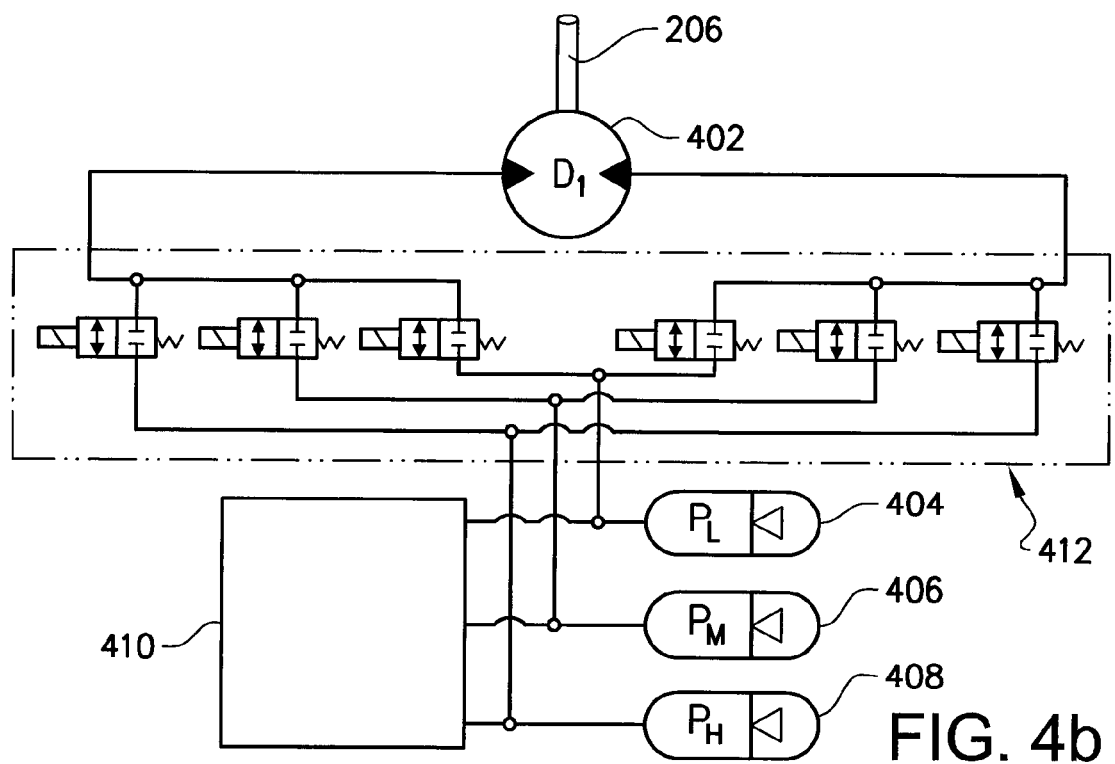

FIG. 4b discloses an example embodiment of the hydraulic system where different discrete levels of torque may be provided through the rotating hydraulic machine 402 having a fixed displacement D1, and three different pressure levels, here provided by three hydraulic accumulators 404, 406, and 408 having pressure levels PL, PM and PH, respectively. As illustrated in FIG. 4b, it is readily realized that two different differential pressure levels may be provided to the hydraulic machine 402 if the first valve means 420 and the second valve means 426 are integrated and connected to three sources of hydraulic fluid having different pressure levels. The different differential pressure levels may be applied to the hydraulic machine 402 via the valve means 412 in a similar manner as described in relation to FIG. 3. The system also comprises an accumulator charging system 410 for providing pressure to the hydraulic accumulators 404, 406, and 408.

In FIG. 4, assuming that PL<PM<PH and that each accumulator 404, 406, 408 may be connected to both sides of the hydraulic machine 402, the following six differential pressures may be provided over the hydraulic machine: ±(PM−PL), ±(PH−PL) and ±(PH−PM).

Figure 5A:
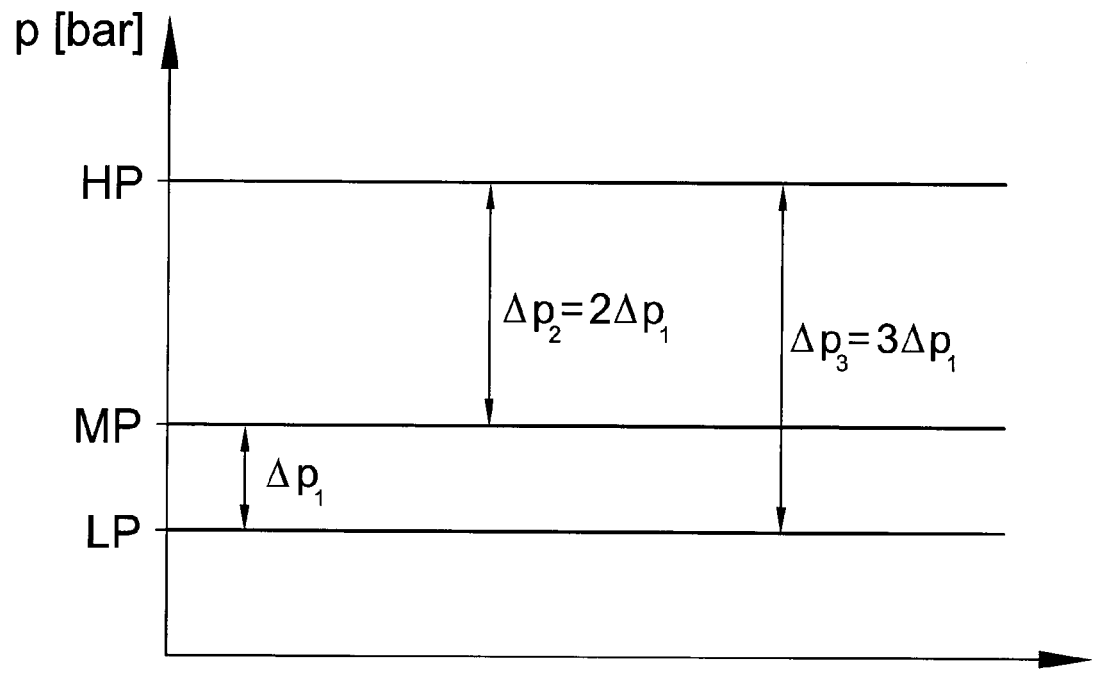
FIGS. 5a-b schematically illustrates pressure levels and torque levels in a hydraulic system according to an example embodiment of the invention.
Figure 5B:
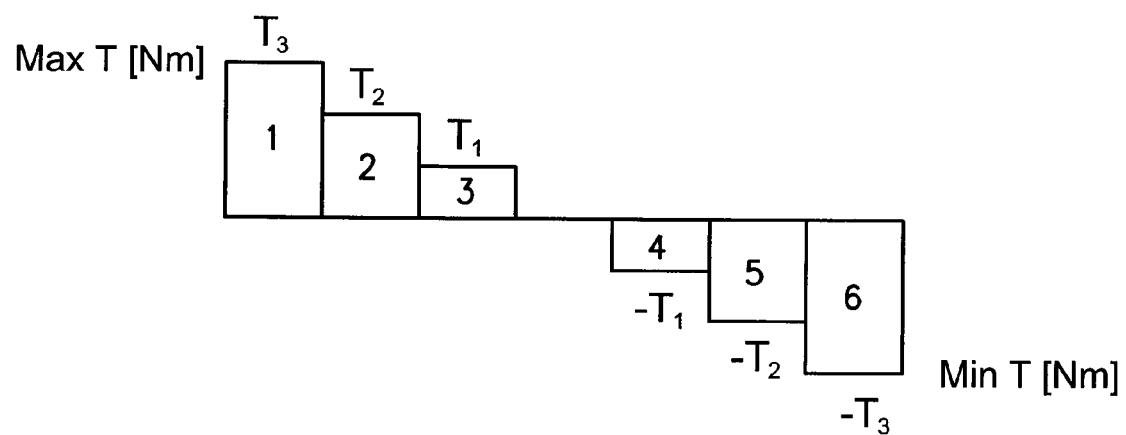

FIG. 5a illustrates different pressures levels and FIG. 5b illustrates different resulting torques in a hydraulic system comprising one hydraulic machine having a fixed displacement D1 and three pressure levels PL, PM and PH corresponding to the system illustrated in FIG. 4 FIG. 5a illustrates an optimized distribution of pressure levels resulting in the maximum number of discrete equidistant torque levels for the given system configuration. The lowest differential pressure can be achieved as $\Delta p1 = PM - PL$, where PM and PL are selected so that $\Delta p1$ corresponds to the lowest discrete torque level, $T1 = D1 * \Delta p1$, required for a particular application. Furthermore, PH is selected so that $\Delta p2 = PH - PM = 2*\Delta p1$. Accordingly, $\Delta p3 = 2*\Delta p1$ and the torque levels $T_2 = 2*D1*\Delta p1$ and $T_3 = 3*D1*\Delta p1$ can be provided. Thereby, three different absolute levels of torque can be provided, which in turn gives seven different torque output states, including the zero output, as illustrated in FIG. 5b. The negative torques represents rotation of the output shaft in the opposite direction. Each successive pressure added to the system would double the number of possible torque levels. To achieve equidistant torque levels, the $n^{th}$ hydraulic pressure level is selected as $P_N = p1 + n*\Delta p1$.

The number of available discrete torque levels can also be increased by increasing the number of hydraulic machines providing a torque to the common output shaft. In order to maintain a constant step size between adjacent torque levels, the displacement of a second fixed displacement hydraulic machine is selected as $D_2 = 7*D1$ in a system comprising the pressure levels selected as discussed above in relation to FIGS. 5a-b.

Figure 6:
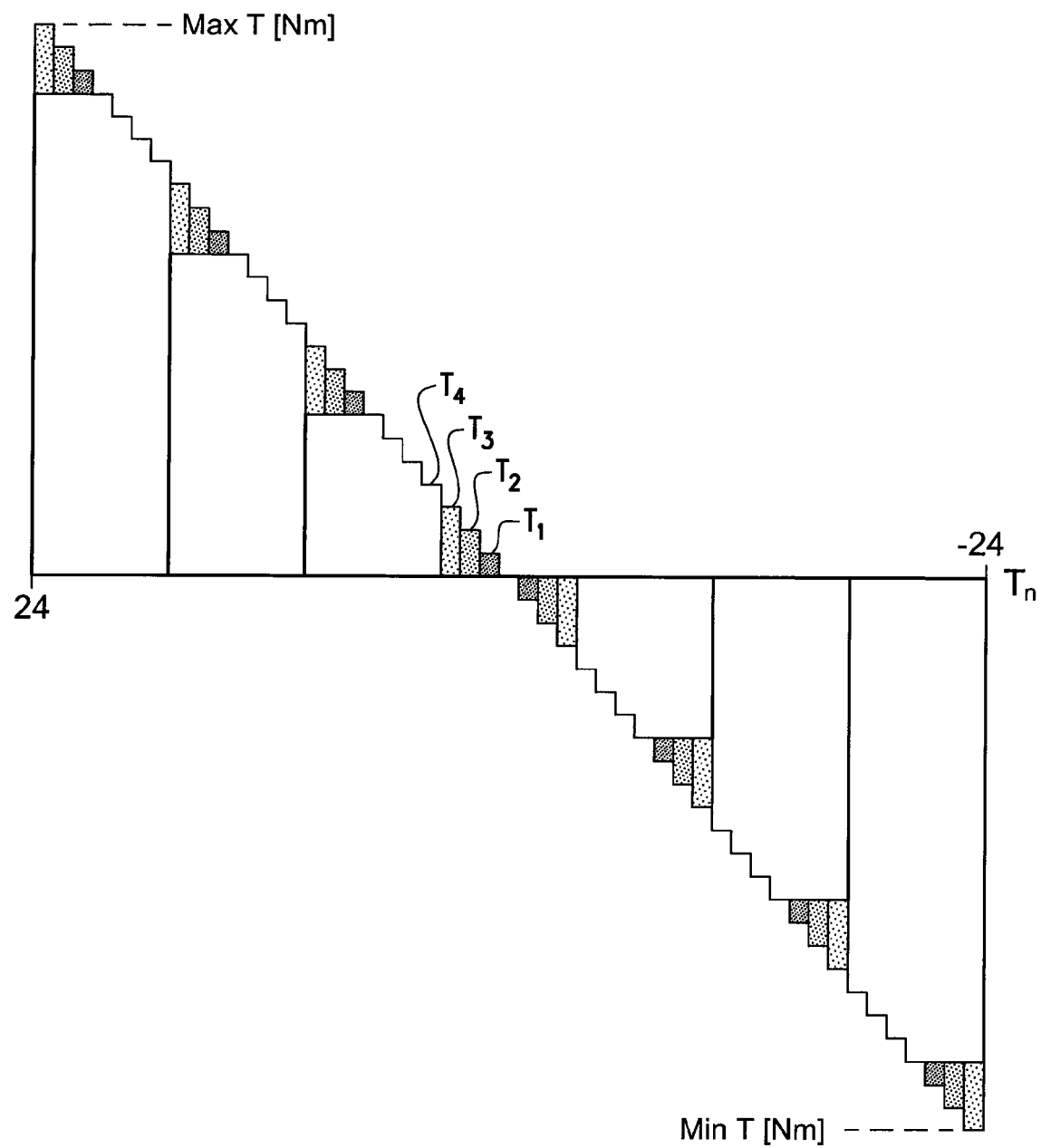
FIG. 6 schematically illustrates torque levels in a hydraulic system according to an example embodiment of the invention.

FIG. 6 illustrates the resulting different torque levels achievable in a system comprising three hydraulic pressure levels and two hydraulic machines introduced above. The lowest torque level T1 corresponds to T1 of FIG. 5b. Thereby, it can be seen that to achieve equidistant steps in torque, the displacement of the second hydraulic machine must be selected as $D2 = 7*Di$ so that a torque corresponding to T1+T3, i.e., $T_4$ in FIG. 6, can be achieved as $D_2*\Delta p1 - D1*3*\Delta p1$. To achieve T4, the lowest differential pressure $\Delta p1$ is applied to the larger hydraulic machine and the highest differential pressure $3*\Delta p1$ is applied to the smaller hydraulic machine in the opposite direction so that the torque T3 is applied to the output shaft in the opposite direction counteracting the torque applied by the larger hydraulic machine. Accordingly, 24 different torque levels can be achieved in each rotating direction. Generalizing the approach of adding hydraulic machines to the system leads to the realization that the displacement of the $k^{th}$ hydraulic machine should be selected as $D_k = D1*(2*n+1)^{k-1}$.

In view of the embodiments illustrated in FIGS. 3 to 6 and discussed above, it is readily realizable that the general concept of the present invention may be extended to provide a large number of discrete levels of output torque, either by adding hydraulic pressure levels and/or hydraulic machines to the system of FIG. 3, or by adding more hydraulic pressure levels to the system illustrated in FIG. 4. Furthermore, one of the pressure levels in the hydraulic system may be the atmospheric pressure, which would reduce the number of possible torque levels, but the system would still be able to provide the functionality of the above described hydraulic systems.

Figure 7:
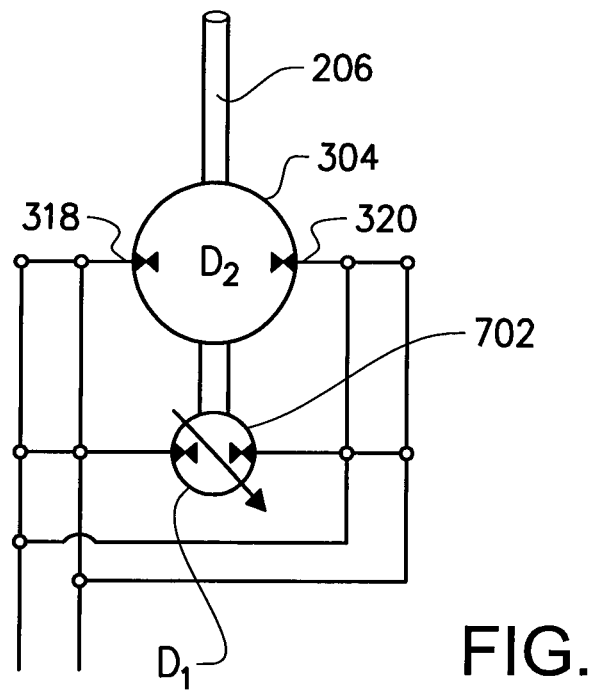
FIG. 7 schematically illustrates a hydraulic system according to art example embodiment of the invention.

FIG. 7 illustrates a hydraulic system similar to the hydraulic system of FIG. 3, with the difference that a hydraulic machine 702 having a variable displacement has been included and arranged to provide a torque to the output shaft together with the fixed displacement hydraulic machine. The variable displacement hydraulic machine 702 may also be connected to each of the hydraulic accumulators via on/off valves in the same way as the hydraulic machine 302 in FIG. 3. However, it is in principle sufficient that the fixed displacement hydraulic machine 702 is only connected to one of the hydraulic accumulators, preferably the one having the highest pressure level, hi principle, it is sufficient that the variable displacement hydraulic machine 702 has a maximum displacement which is equal to or lower than the lowest displacement of the fixed displacement hydraulic machines. Thereby, an energy efficient hydraulic system is provided utilizing the advantages of fixed displacement hydraulic machines which can also provide a continuously variable output torque through the use of a variable displacement hydraulic machine of relatively small size.

By applying the same principles as discussed in relation to FIG. 6, a continuous output torque can be provided by controlling the torque contribution to the output shaft of the variable displacement hydraulic machine 702.

Figure 8:
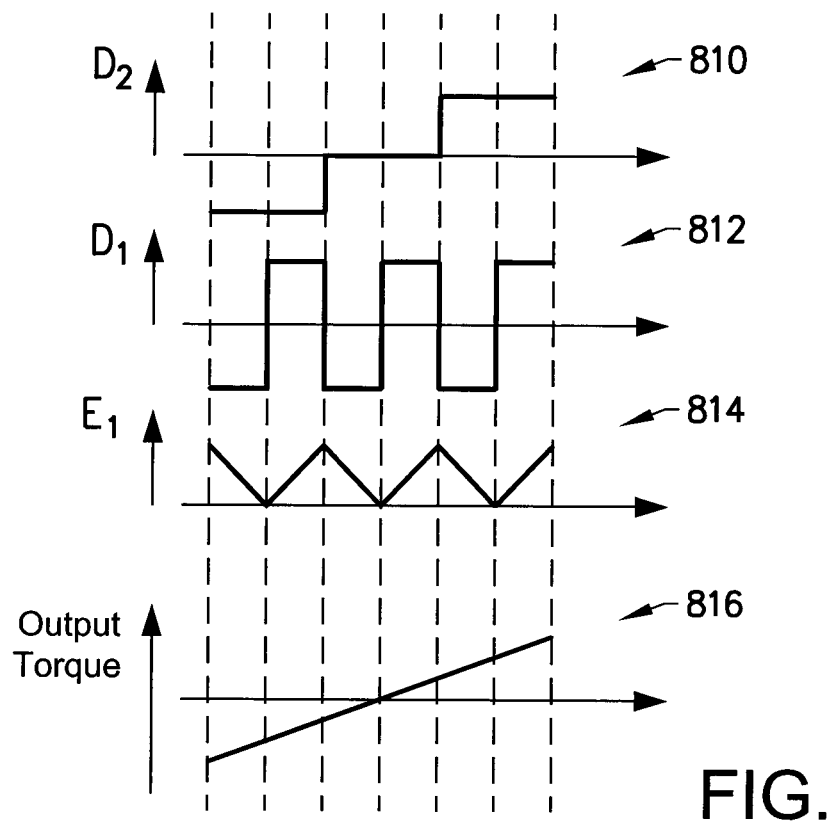
FIG. 8 schematically illustrates a method for controlling a hydraulic system according to an example embodiment of the invention.

The graphs of FIG. 8 further illustrate how the continuous output torque is achieved. Here, the maximum displacement D1 is smaller than D2, and D1 must at least be equal to or larger than D2/2 for a continuous torque variation to be possible. For illustrative purposes, only one differential pressure level is used. Graph 810 illustrates the pressure for a fixed displacement hydraulic machine, graph 812 illustrates the pressure for a variable displacement hydraulic machine, graph 814 illustrates the setting of the variable displacement hydraulic machine from fully open to fully closed, i.e. the torque output, and graph 816 illustrates the resulting output torque.

By using a variable displacement hydraulic machine in combination with at least one fixed displacement hydraulic machines, a continuously variable output torque can be provided. By using a relatively small variable displacement hydraulic machine, having a maximum displacement which is equal to or lower than the lowest displacement of the fixed displacement pumps, an energy efficient hydraulic system is provided utilizing the advantages of fixed displacement hydraulic machines which can also provide a continuously variable output torque.

However, it is also possible to achieve a continuously variable output torque using only fixed displacement machines and constant pressure levels through the use of for example a proportional servo valve to control the flow to one of the hydraulic machines. Instead of a proportional valve, it is also an option to arrange several on/off valves in parallel where each valve has an area which is smaller than what is required to provide the appropriate flow to the hydraulic machine.

It should also be noted that one or more of the hydraulic machines used can be operated as a hydraulic motor or a combined hydraulic motor and hydraulic pump. Such a hydraulic machine with said both functions can be used as a hydraulic motor for generating torque to the mechanical drive shaft or as a pump, thus using a driving torque to generate a hydraulic pressure difference over the hydraulic machine. The pumping functionality can be useful for instance for energy recuperation purposes.

Even though the invention has been described with reference to specific exemplifying embodiments thereof, many different alterations, modifications and the like will become apparent for those skilled in the art. For example, the embodiments described herein have been discussed with relation to a desired output torque. It is of course also possible to use a control system where the control parameter is a desired rpm, position of an actuator, position of an implement or the like. Furthermore, that the configurations of the systems illustrated herein are selected with reference to a working machine does not limit the invention as it may be applied in various applications where a hydraulic system is used.

Also, it should be noted that parts of the system may be omitted, interchanged or arranged in various ways, the hydraulic system yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A hydraulic system comprising:
a first rotating hydraulic machine and a second rotating hydraulic machine, the first and second hydraulic machine being arranged to provide a torque via a common output shaft;
first valve means for providing a differential hydraulic pressure level over the first hydraulic machine by using a plurality of sources of hydraulic fluid having different hydraulic pressure levels;
second valve means for providing a differential hydraulic pressure level over the second hydraulic machine by using the plurality of sources of hydraulic fluid having different hydraulic pressure levels; and
a control unit configured to control the first valve means and the second valve means such that different discrete levels of torque are provided via the output shaft of the hydraulic system,
wherein the hydraulic system comprises sources of fluid at at least three different pressure levels.

2. The hydraulic system according to claim 1, wherein at least one of the first and second hydraulic machine is a fixed displacement hydraulic machine.

3. The hydraulic system according to claim 1, wherein the first hydraulic machine has a first fixed displacement and the second hydraulic machine has a second fixed displacement, the second fixed displacement being the same as the first fixed displacement.

4. The hydraulic system according to claim 1, wherein the first hydraulic machine has a first fixed displacement and the second hydraulic machine has a second fixed displacement, the second displacement being different from the first fixed displacement.

5. The hydraulic system according to claim 1, wherein the first hydraulic machine is a fixed displacement hydraulic machine and the second hydraulic machine is a variable displacement hydraulic machine.

6. The hydraulic system according to claim 1, wherein the differential hydraulic pressure level is provided by using a first hydraulic accumulator having a first hydraulic pressure level and a second hydraulic accumulator having a second hydraulic pressure level, the first hydraulic pressure level being different from the second hydraulic pressure level.

7. The hydraulic system according to claim 6, wherein the pressure level of the first hydraulic accumulator is fixed within a first predetermined range, and a pressure level of the second hydraulic accumulator is fixed within a second predetermined range, the second predetermined range being different from the first predetermined range.

8. The hydraulic system according to claim 6, further comprising an accumulator charging system.

9. The hydraulic system according to claim 1, wherein the first valve means comprises a first valve connected between a first valve means first source of hydraulic fluid and a first side of the first hydraulic machine and a first valve means second valve connected between a second source of hydraulic fluid and a second side of the first hydraulic machine, and the second valve means comprises a first valve connected between a second valve means first source of hydraulic fluid and a first side of the second hydraulic machine and a second valve connected between a second valve means second source of hydraulic fluid and a second side of the second hydraulic machine.

10. The hydraulic system according to claim 1, wherein the first valve means and the second valve means are comprises in a valve block, the valve block comprising:
 at least two inlets for hydraulically connecting the valve block to each of at least two sources of hydraulic fluid having different pressure levels;
 at least four outlets for hydraulically connecting the valve block to a first side a second side of each of the first and the second hydraulic machine;
 wherein the valve block is configured so that each inlet can be connected to each outlet.

11. The hydraulic system according to claim 1, wherein the valve means comprises on/off valves.

12. The hydraulic system according to claim 1, wherein the first hydraulic machine has a first fixed displacement D1, and the second hydraulic machine has a second fixed displacement D2=D1*(2*n+1), where n is the number of different hydraulic pressure levels available in the hydraulic system.

13. The hydraulic system according to claim 1, comprising k fixed displacement hydraulic machines, k≥2, each hydraulic machine having a fixed displacement different from a fixed displacement of any of the remaining hydraulic machines, and n different hydraulic pressure levels, n≥2, where the displacement for hydraulic machine k is Dk=D1*(2*n+1)$^{k-1}$, where D1 is the lowest fixed displacement.

14. The hydraulic system according to claim 1, wherein a difference in pressure between the two lowest pressure levels, p1 and p2, is Δp1=p2−p1 and wherein a pressure of an nth hydraulic pressure level is selected as pn=p1+n*Δp1 and n is greater than or equal to three.

15. A working machine comprising a hydraulic system according to claim 1.

16. A hydraulic system comprising:
 a rotating hydraulic machine arranged to provide a torque via an output shaft;
 first valve means for providing a first differential hydraulic pressure level over the hydraulic machine by using two sources of hydraulic fluid having different hydraulic pressure levels,
 second valve means for providing a second differential hydraulic pressure level over the hydraulic machine by using two sources of hydraulic fluid having different hydraulic pressure levels, an absolute value of the second differential hydraulic pressure level being different from an absolute value of the first differential hydraulic pressure level; and
 a control unit configured to control the first valve means and the second valve means such that different discrete levels of torque are provided via the output shaft of the hydraulic system.

17. The hydraulic system according to claim 16, wherein the rotating hydraulic machine has a fixed displacement.

18. The hydraulic system according to claim 16, comprising:
 a first source of hydraulic fluid having a first hydraulic pressure level;
 a second source of hydraulic fluid having a second hydraulic pressure level different from the first pressure level;
 a third source of hydraulic fluid having a third hydraulic pressure level different from the first and the second pressure level; wherein the first valve means and the second valve means use one source of hydraulic fluid in common.

19. The hydraulic system according to claim 18, wherein a difference in pressure between the second pressure level and the third pressure level is substantially twice the difference between the first pressure level and the second pressure level.

20. The hydraulic system according to claim 16, wherein each of the first valve means and the second valve means comprises a first valve connected between a first respective source of hydraulic fluid and a first side of the hydraulic machine, and a second valve connected between a second respective source of hydraulic fluid and a second side of the hydraulic machine.

21. The hydraulic system according to claim 16, wherein the valve means comprises on/off valves.

22. A method for controlling a hydraulic system to provide discrete levels of output torque, the system comprising:
 a plurality of hydraulic machines arranged to provide a torque via a common output shaft, and valve means for providing a plurality of differential hydraulic pressures to each of the hydraulic machines, via the valve means, from at least three sources of hydraulic fluid; the method comprising:
 controlling the valve means in response to a requested output torque level such that discrete output torque levels are provided by the output shaft by:
 if the requested output torque level is equal to or lower than a minimum torque level of the hydraulic system, providing the minimum output torque level by applying the lowest differential hydraulic pressure to a hydraulic machine having the lowest fixed displacement;
 if the requested output torque level is equal to or higher than a maximum torque level of the hydraulic system, providing a maximum output torque level by applying the highest differential hydraulic pressure to all of the plurality of hydraulic machines; and
 if the requested output torque level is between the minimum output torque level and the maximum output torque level, applying a differential hydraulic pressure to at least one of the hydraulic machines such that a torque level closest to the requested torque level is provided.

23. A method for controlling a hydraulic system to provide discrete levels of output torque, the system comprising:
 a hydraulic machine arranged to provide a torque via an output shaft, and valve means for providing at least three differential hydraulic pressures to the hydraulic machine, via the valve means, from at least three sources of hydraulic fluid; the method comprising:
 controlling the valve means in response to a requested output torque level such that discrete output torque levels are provided by the output shaft by:
 if the requested output torque level is equal to or lower than a minimum torque level of the hydraulic system, providing the minimum output torque level by applying the lowest differential hydraulic pressure to the hydraulic machine;

if the requested output torque level is equal to or higher than a maximum torque level of the hydraulic system, providing a maximum output torque level by applying the highest differential hydraulic pressure to the hydraulic machine; and if the requested output torque level is between the minimum output torque level and the maximum output torque level, applying a differential hydraulic pressure to the hydraulic machine such that a torque level closest to the requested torque level is provided.

24. A method for controlling a hydraulic system to provide discrete levels of output torque, the system comprising:

a first hydraulic machine having a fixed displacement, arranged to provide a torque via a common output shaft;

a second hydraulic machine having a variable displacement, arranged to provide a torque via the common output shaft, first valve means for providing a differential hydraulic pressure level over the first hydraulic machine by using a plurality of sources of hydraulic fluid having different hydraulic pressure levels;

second valve means for providing a differential hydraulic pressure level over the second hydraulic machine by using the plurality of sources of hydraulic fluid having different hydraulic pressure levels, wherein the hydraulic system comprises sources of fluid at at least three different pressure levels;

the method comprising the steps of:

controlling the valve means and the second hydraulic machine in response to a requested output torque level such that discrete output torque levels are provided by the output shaft by:

applying a differential hydraulic pressure to the first hydraulic machine such that a torque level closest to the requested torque level is provided; and controlling the displacement and direction of the second hydraulic machine to add torque to or receive torque from the output shaft such that the requested output torque is provided.

* * * * *